Dec. 17, 1946.   K. K. BOWMAN ET AL   2,412,864
CONTROL SYSTEM
Original Filed Aug. 20, 1937   2 Sheets-Sheet 1

Inventors:
Garold A. Kane,
Kenneth K. Bowman,
by Harry E. Dunham
Their Attorney.

Patented Dec. 17, 1946

2,412,864

UNITED STATES PATENT OFFICE 2,412,864

CONTROL SYSTEM

Kenneth K. Bowman and Garold A. Kane, Scotia, N. Y., assignors to General Electric Company, a corporation of New York Application August 20, 1937, Serial No. 160,092
Renewed June 13, 1939

19 Claims. (Cl. 172—239)

This invention relates to control systems, more particularly to follow-up control systems and the like, in which a driven object is caused to move into positional agreement with a pilot device so as to reproduce the movements and positions of the pilot device, and an object of the invention is the provision of a simple, reliable, improved and inexpensive device of this character.

Heretofore, follow-up systems have been utilized in which electric valves have been employed for controlling the driving means of the system. These systems have given satisfactory and accurate operation. However, electric valves are expensive, have a definite life and therefore require replacement at intervals. Furthermore, the circuits are often very complicated and not well understood by operators and attendants, and repairs and maintenance are therefore difficult. Accordingly, a more specific object of the invention is the provision of a follow-up system that possesses substantially the same degree of accuracy as a follow-up system utilizing electric valves but one that is considerably less expensive, and so simple in construction, circuit arrangement and operation as to be readily comprehended by operators and attendants.

Follow-up systems are subject to the disadvantage of oscillation or "hunting" of the driven object about the position of correspondence with the pilot device unless special means are provided to eliminate this difficulty. Electric transmitting and receiving devices are frequently employed in follow-up systems for responding to positional disagreement of the pilot device and driven object to control the driving means.

A further object of this invention is the provision of entirely electrical means for introducing an anti-hunting correction into the windings of the electrical motion receiving device so that no torque is imposed mechanically on the receiving device.

In carrying the invention into effect in one form thereof, suitable means are provided for driving the driven object, and a Wheatstone bridge is provided for controlling the supply of power to the driving means, together with means responsive to positional disagreement of the pilot device and driven object for controlling the balance of the bridge to cause the driving means to drive the driven object toward correspondence with the pilot device, and means responsive to an operating condition of the driving means are provided for introducing a correction so as substantially to eliminate hunting. In a specific embodiment, the anti-hunting means are responsive to the torque of the driving means and the correction is introduced so as to control the bridge to anticipate the position of correspondence and to reduce the driving torque so as substantially to eliminate hunting.

In illustrating the invention in one form thereof, it is shown as embodied in a follow up system for causing a searchlight to move into positional agreement with a sighting device. It will be understood, however, that the invention has other applications.

For a better and more complete understanding of the invention reference should now be had to the following specification and to the accompanying drawings in which.

Figures 1, 2:
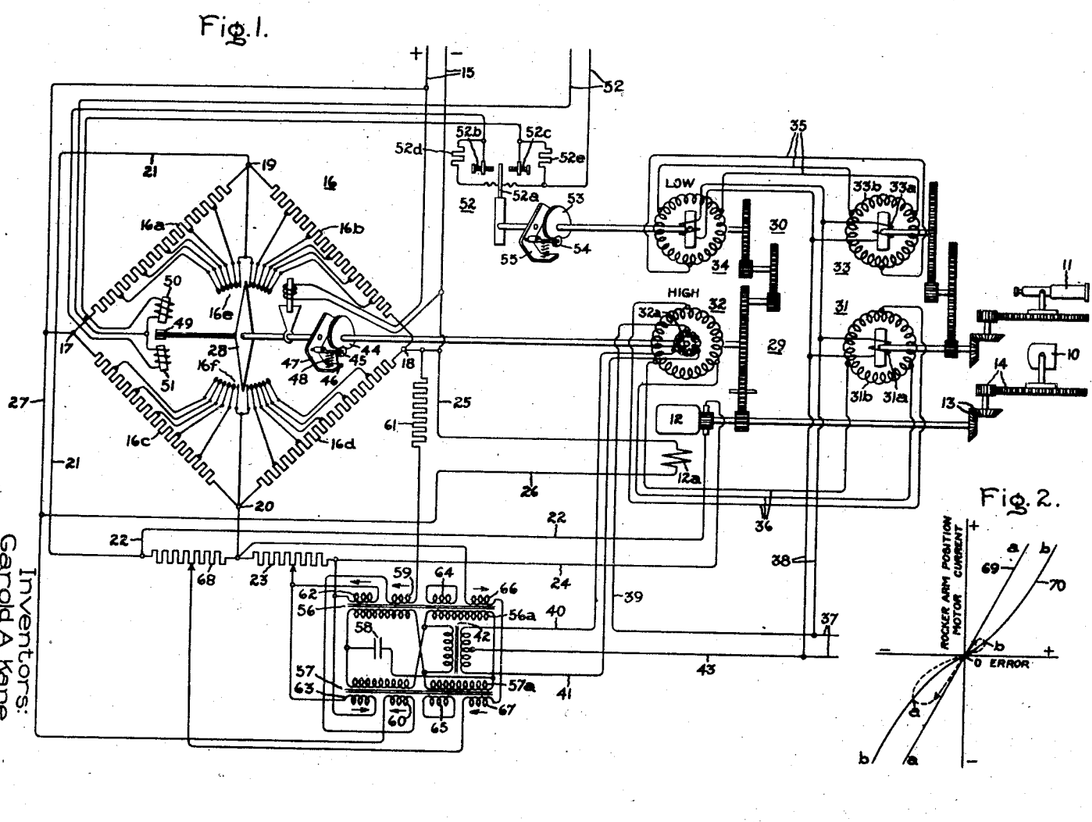
Fig. 1 is a simple diagrammatic representation of an embodiment of the invention.
Fig. 2 is a chart of operating characteristics.

Referring now to the drawings, an object, such for example as searchlight 10, is to be driven in accurate correspondence with a pilot device such as the telescope 11. Searchlight 10 is driven by any suitable driving means represented in the drawings by the direct current electric motor 12 to the drive shaft of which the searchlight is connected by means of gearing 13 and 14. As shown, motor 12 is of the direct current type and is supplied with power from a suitable source represented in the drawings by the supply lines 15. The supply of current to motor 12 is controlled by suitable means illustrated as a Wheatstone bridge 16. As indicated in the drawings, the upper side of the bridge 16 comprises resistance arms $16_a$ and $16_b$ and the lower side of the bridge comprises resistance arms $16_c$ and $16_d$. The diagonally opposite points 17 and 18 of the bridge are connected to opposite sides of the source 15 and the remaining diagonally opposite bridge points 19 and 20 are connected to the armature terminals of the motor 12. Bridge point 19 is connected to one armature terminal of the motor 12 by means of conductors 21 and 22 and the diagonally opposite bridge point 20 is connected through resistance 23 and conductor 24 to the opposite terminal of the motor armature.

Motor 12 is provided with a direct current field winding $12_a$ which is supplied from a suitable source such as the source 15 to which it is connected by means of conductors 25, 26 and 27.

When the bridge 16 is balanced, the voltages of the diagonally opposite bridge points 19 and 20 are equal and no current is supplied to the motor 12 and the latter is therefore at standstill.

Suitable means, shown as a pivotally mounted rocker arm member 28 is provided for controlling the balance of the bridge, and means responsive to positional disagreement of the pilot device 11 and the driven object 10 are provided for actuating the rocker arm 28. These means are illustrated as high and low speed self-synchronous electrical motion transmission systems 29 and 30, respectively. The high speed motion transmission system comprises an electrical motion transmitting device 31 and an electrical motion receiving device 32, and similarly the low speed electrical motion transmission system comprises a transmitting device 33 and a receiving device 34. The rotor member of the transmitter 31 is connected to the telescope 11 through a suitable gear train so as to rotate at a suitable high speed ratio such as 36 to 1 with the rotation of the telescope, while the rotor of the transmitting device 33 is preferably driven in a 1 to 1 ratio with the telescope. Thus, for each degree of rotation of the telescope 11, the rotor of the high speed transmitting device 31 rotates 36° and consequently a very fine and accurate control is obtained.

The transmitting and receiving instruments 31 to 34 inclusive may be of any suitable type. Preferably an alternating current type is employed, each instrument being provided with a polycircuit armature winding and with a field winding. As shown, the transmitters 31 and 33 are provided with field windings 31a and 33a respectively on their rotor members and with delta connected, bi-polar, three-phase armature windings 31b and 33b respectively on their stator members. The receiver 34 is similar in construction to the transmitters 31 and 33. Corresponding points of the armature windings of the receiver 34 and the transmitter 33 are connected together by means of three conductors 35 and similarly corresponding points of the armature windings of the receiver 32 and transmitter 31 are connected together by means of the three conductors 36. The single phase field windings of transmitters 31 and 33 and receiver 34 are supplied with alternating current from a suitable source such as that represented by the supply lines 37 to which these windings are connected by means of conductors 38.

The rotor member of the high speed receiving device 32 differs from the rotor member of the low speed receiving device 34 in that it is provided with a polycircuit distributed winding 32a. This winding is shown as a delta connected winding and one of the delta points is connected by means of conductor 39 to one side of the alternating current source 37. The other two delta points of this winding are connected by means of conductors 40 and 41 to the terminals of the secondary winding of a transformer 42, the midpoint of which winding is connected by means of conductor 43 to the other side of the alternating current source 37.

The arms 16a, 16b, 16c and 16d of the bridge are preferably resistors and each of these arms is provided with a plurality of taps as shown. Each tap in turn is provided with a flexible contact, preferably a resilient heat-tempered spring contact. The spring contacts for the two arms 16a and 16b comprising the upper side of the bridge are arranged in a row 16e, and similarly the spring contacts for the arms 16c and 16d, constituting the lower side of the bridge, are arranged in a row 16f spaced from the upper row. Each contact is initially adjusted so that it is spaced from its neighboring contact when both are undeflected. When the contact rocker arm 28 is in the central or null position in which it is shown, all of the spring contacts are in their undeflected positions and the bridge is balanced so that no voltage is supplied to the motor 12. If the rocker arm 28 is rotated in a counterclockwise direction it engages the first spring contact for the arm 16a and also the first spring contact for the arm 16d. As the rotation of the arm 28 continues the first contacts of arm 16a and 16d are deflected into engagement with the second contacts of the arms 16a and 16b thereby short circuiting a portion of the resistance of each of the arms 16a and 16d. If the rotation of the arm 28 is continued to its extreme left-hand position, the second contacts of each of the arms will be forced into engagement with the third contacts, etc., and thus the individual portions of the resistance arms 16a and 16d are successively short circuited until the entire arms are short circuited. This of course produces maximum unbalance of the bridge and maximum voltage is supplied to the armature of motor 12. Similarly, clockwise rotation of the contact rocker arm 28 from its central and lower position produces successive short circuiting of the opposite bridge arms 16b and 16c until in the extreme right-hand position of the arm 28, the arms 16b and 16c are entirely short circuited, maximum unbalance of the bridge is obtained and maximum voltage of reverse polarity is supplied to the motor 12 so as to cause it to rotate in the reverse direction.

Resistors 52d and 52e are connected across movable contact 52a and stationary contacts 52b and 52c respectively so that a definite amount of current always flows from source 52f through the operating coils of electromagnets 50 and 51.

In the central position in which armature 49 is illustrated, it is unaffected by electromagnets 50 and 51. However, when the armature is displaced from its zero position toward one of the electromagnets, the pull of the two electromagnets on the armature will be unequal. The pull of the electromagnet which the armature is approaching will increase and the pull of the other will decrease. This increasing pull builds up in a parabolic relationship with respect to the distance between the armature and the electromagnet.

The structure and arrangement of the flexible contacts in the rows 16e and 16f are such as to give substantially the same parabolic relationship between the amount of rotation of rocker arm 28 and the force required to close the contacts. Consequently the variable pull of the electromagnets tends to compensate the contact spring pressure.

This feature has several important advantages. The error in a system of this character is a function of the movement of the rocker arm 28 and the pressure which it exerts against the spring contacts 16e and 16f. Hence, reducing this pressure increases the accuracy of the system or permits the use of heavier spring contacts, or a greater number thereof for the same accuracy. The use of heavier spring contacts increases the maximum possible power output of the equipment.

Another advantage is the reduction of interference between units. Assume, for example, that four units are connected to one director or transmitting unit and that a fifth unit is to be connected and synchronized with the other units and the director. In this example, the director consists of the telescope and high and low speed transmitting devices, and the unit consists of the remaining apparatus shown in Fig. 1. During this synchronizing operation the rocker arm of the bridge of the incoming unit will be held in an extreme position by one of the electromagnets and the heart cam 44 will rotate. Owing to the shape of the heart cam and the pressure of the roller against it, considerable power is required to rotate it during part of each revolution, and during the remainder of each revolution considerable power is required to prevent it from rotating too fast. This power must come from the high speed receiving device, and this device in turn reacts through the electrical connections on the other four high speed receiving devices, to cause them to oscillate through a small arc. By utilizing the spring contact pressure compensating means, the output of the heart cam can be made lower than otherwise would be necessary and the reaction of the high speed receiving devices on each other can be reduced to such an extent as to become unobjectionable.

The rotor member of the high speed receiving device 32 is connected to the contact rocker arm 28 through a yieldable coupling comprising a heart-shaped cam 44 with which cooperates a spring pressed roller 45. As shown, the cam 44 is mounted on the rotor shaft of receiving device 32 and the roller 45 is carried on the end of an arm 46 which is pivotally mounted on a frame 47. Bearing against the arm 46 is a helical spring 48 which forces the arm towards the heart cam and thereby maintains the roller in engagement with the cam. The heart cam is constructed and arranged on its shaft in such a manner that the roller 45 is caused by the spring 48 to seek a position of rest at the base of the cam, as shown in the drawings. The frame 47 is directly connected to the rocker arm 28 as indicated.

Thus it will be seen that a limited rotation of the cam 44 in either direction from the central or position in which it is shown will effect a rotation of the rocker arm 28 in a corresponding direction. However, if the rocker arm 28 is actuated to an extreme position the cam 44 can continue its rotation while the rocker arm 28 remains stationary in its extreme position.

The contact rocker arm 28 is provided with an armature member 49 arranged between two solenoids 50 and 51. A selector switch 52 having a movable contact member 52a and two stationary contacts 52b and 52c is provided for selectively energizing the solenoids 51 and 50. The movable contact 52a is connected to the rotor of the low speed receiving device 34 through the yielding connection comprising the heart-cam 53, spring pressed roller 54 and carrying frame 55 which is identical with the heart-cam 44 and its cooperating mechanism described in the foregoing. As shown, the stator members of the receiving devices 32 and 34 are rotatably mounted and geared to the shaft of the drive motor 12 and hence are connected to the driven object 10. The ratio of the gearing between the motor 12 and the stator member of the high speed receiving device 32 is the same as that between the telescope 11 and the rotor of the transmitting device 31, which in this particular case is assumed to be 36 to 1. Similarly, the ratio of the gearing between the stator member of the receiving device 34 and the motor 12 is the same as the ratio of the gearing between the telescope 11 and the rotor member of the transmitter 33 which was assumed to be 1 to 1.

As is well understood, electrical motion transmitting and receiving devices connected and energized in the manner described for the instruments 31, 32, 33 and 34, have the property of self-synchronism. In other words, if the stator member of the receiving device 32 is restrained and the rotor member of the transmitting device 31 is turned from the original position with respect to its stator winding in which it is shown to a new position, the rotor member of the receiving device will turn to a corresponding position with respect to its stator winding. Thus, if the rotor member of the transmitter 31 is rotated a given angle, e. g., 10° in a clockwise direction and the stator member of the receiving device 32 is restrained, the rotor member of the receiver will rotate 10° in a clockwise direction and the rotor members of both devices will again be in positions of correspondence with respect to their stator windings. It will also be noted that if the rotor member of receiver 32 remains at rest and the stator member is rotated 10° in a counterclockwise direction while the rotor member of the transmitting device 31 is being rotated 10° in a clockwise direction the rotor member of the receiver would be in the same position with respect to its stator winding as if it had rotated in a clockwise direction and the stator member had remained at rest. In other words, if the stator member of the receiving device is rotated in a direction opposite to that in which the rotor member tends to rotate and at the same speed as that at which the rotor of the transmitter rotates, the rotor member of the receiver will remain standing still in space. This is also true of the transmitting and receiving devices 33 and 34. When the driven object 10 is in correspondence, i. e., in positional agreement with the pilot device 11, the rotors and stators of the transmitting and receiving devices 31 to 34, inclusive, are in the positions in which they are illustrated in the drawings.

In order to prevent hunting, an anti-hunting device is provided, comprising two saturable core reactors 56 and 57. The alternating current windings 56a and 57a respectively, of these reactors are connected in parallel to form a bridge as shown, and are supplied from a suitable source of alternating voltage represented by the supply lines 58. Source 58 may be, and preferably is, the same source as that represented by supply lines 37. Reactors 56 and 57 are provided with direct current magnetization control windings 59 and 60. These two windings are connected in series relationship as indicated and are supplied with direcct current from a suitable source such as that represented by the supply lines 15 to which they are connected through the resistor 61.

The reactors 56 and 57 are also provided with direct current windings 62 and 63. These direct current windings 62 and 63 are connected in parallel relationship with each other across a portion of the resistor 23 so that they are energized in accordance with the current supplied to the driving motor 12.

When the direct current magnetization of a saturable reactor is minimum, the reactive voltage drop across the alternating current coil of the reactor is maximum and conversely when the direct current magnetization of the saturable reactor is maximum the reactive voltage drop across the alternating current coil is minimum. As shown, the coils 62 and 63 are arranged oppositely with respect to each other, that is to say, these coils are so arranged on their cores that with the motor current in one direction the coil 62 aids the coil 59 and the coil 63 bucks the coil 60. The primary winding of the transformer 42 is connected across the diagonally opposite points of the bridge formed by the two alternating current coils 56a and 57a. When no current is flowing in the armature circuit of the motor 12, and consequently no current is flowing in the coils 62 and 63, the bridge is balanced and no voltage is applied to the primary winding of the transformer 42. If current is flowing in the motor circuit the bridge is unbalanced in one direction or the other and a voltage is applied to the primary winding of the transformer 42, and this voltage is supplied through the transformer 42 to the rotor winding of the receiving device 32 in such a direction that a torque is produced which causes the rotor member of the receiver 32 to turn in such a direction as to rotate the rocker arm 28 in a direction to reduce the current supplied to the motor 12.

As shown in the drawings, reactors 56 and 57 are also provided with short circuited stabilizing coils 64 and 65 and with coils 66 and 67 which are connected in series relationship with each other and arranged to act in opposition. That is to say, with current flowing in one direction through the coils 66 and 67 such as represented by the arrows, the magnetization of the coil 66 will oppose the magnetization of the coil 59 whereas the magnetization of the coil 67 will aid the magnetization of the coil 60. These two coils 66 and 67 are connected across a portion of the resistor 68 which is connected across the brushes of the motor 12 through the resistor 23. Thus the coils 66 and 67 are energized in accordance with the counter-voltage of the motor and therefore in accordance with its speed.

With the foregoing understanding of the elements and their arrangement and connection in the system, the operation of the system itself will be readily understood from the following detailed description.

Assuming the system to be at rest and assuming the driven object 10 to be in positional agreement with the pilot device, the apparatus is in the condition in which it is illustrated in the drawings. The director handle (not shown) is turned to rotate the telescope 11. This produces rotation of the rotors of the transmitters 31 and 33. The rotor of the transmitter 31 rotates 36° for each degree of rotation of the telescope and the rotor of the transmitter 33 which rotates at the same speed as the telescope. Since the motor 12 and the searchlight 10 are at rest when the telescope 11 is first moved, the stator members of the receivers 32 and 34 are restrained against movement and consequently the rotors of the receivers rotate in correspondence with the rotors of their respective transmitting devices. Assuming clockwise rotation of the rotor members of the transmitting devices, the rotors of the receiving devices will also rotate in a clockwise direction. Clockwise rotation of the rotor of the receiver 32 will produce clockwise rotation of the cam 44 and also clockwise rotation of the contact rocker arm 28, and as previously explained, clockwise rotation of the rocker arm 28 will successively short circuit portions of the arms 16b and 16c of the bridge 16 and thus produce an unbalance of the bridge 16 so that a voltage is supplied to the armature of motor 12. This voltage causes the motor 12 to rotate in a direction to drive the searchlight 10 into correspondence with the telescope 11. The gearing between the motor 12 and the stator members of the receivers 32 and 34 is so arranged that the stator members are rotated in a direction opposite to that in which the rotors are rotated. The motor 12 accelerates rapidly and when its speed has increased to the value at which the stator member of the receiver 32 is driven counterclockwise at the same speed as the speed at which the rotor member of the transmitter is rotating in a clockwise direction the rotor member of the receiver 32 will come to rest in space. At this point the rotor member of the receiver is rotated from its initial position by an amount necessary to deflect the rocker arm to a position to produce an unbalance of the bridge and a voltage sufficient to cause the motor 12 to drive the searchlight 10 at a speed equal to the speed at which the telescope 11 is rotating. The rotor member of receiver 34 is rotated a proportional amount, i. e., one thirty-sixth of the rotation of receiver 32. If the speed of the director is further increased, the rotor members of the receivers 32 and 34 will rotate in a clockwise direction thereby causing more of the flexible contacts to be short circuited by the rocker arm 28 and the speed of the motor 12 and the searchlight 10 correspondingly increased. When the speed of the searchlight 10 becomes equal to that of the telescope 11 the stator members of the receivers 32 and 34 will be driven in a counterclockwise direction at the same speed as the rotors of the transmitters 31 and 33 are being driven in a clockwise direction and consequently the rotors of the receivers 32 and 34 will again come to rest.

If the speed of the telescope 11 is increased to the maximum speed at which the motor 12 can drive the searchlight 10, the rocker arm 28 will be in its extreme right-hand position in which all of the portions of the bridge arms 16b and 16c are short circuited and the rotors of the receivers 32 and 34 will again come to rest. The rotor member of receiver 32 will be rotated from its initial position just sufficiently to cause the rocker arm 28 to be maintained in its extreme right-hand position. This will produce maximum unbalance of the bridge and maximum power will be supplied to the motor 12 causing it to rotate the searchlight 10 at maximum speed. Under these conditions the armature 49 attached to the rocker arm 28 will be in proximity or in engagement with the core of the solenoid 50. However, if the speed of the telescope 11 is further increased the rotors of the receiving devices 32 and 34 would begin to rotate, and since the speed of the motor 12 cannot be further increased the rotors of the receivers would continue to rotate as long as the telescope 11 is rotated at this increased speed. The heart cams 44 and 53 permit this continuous rotation. As soon as heart cam 53 has rotated a small amount, depending upon the setting of the contact 52 the movable contact member 52a would engage the stationary contact member 52c (clockwise rotation of the rotor of the transmitter 33 having been assumed). This completes an energizing circuit for the solenoid 50, which in response to energization attracts and holds the armature 49 so that the contact rocker arm 28 is held in the maximum power position irrespective of the heart cam 44 which is kept in rotation by the rotation of the rotor of the receiver 32 as long as the speed of the telescope is greater than the maximum speed at which the motor 12 can drive the searchlight 10. The amount of rotation of the rotor of receiver 34 and cam 53 necessary to cause movable contact member 52a to engage either of its cooperating stationary contacts may be any desired amount, for example 2½°. Since the speed ratio between the rotors of receivers 32 and 34 is 36:1 it will be noted that 2½° movement of the rotor of receiver 34 and cam 53 from their initial position corresponds to 90° rotation of the rotor of receiver 32 and cam 44 from their initial position.

Now if the telescope 11 is suddenly decelerated and stopped the movable contact member 52a will remain in engagement with stationary contact member 52c until motor 12 has driven searchlight 10 to within 2½° of correspondence with the telescope or in other words until the rotor of receiver 34 and the cam 53 approach to within 2½° of their initial positions. At this point the rotor of high speed receiver 32 and cam 44 will be within 90° of their initial positions. As the movable member 52a breaks contact with the stationary member 52c the contact rocker arm 28 will still be rotated from its original position by the heart cam 44 until the stator member of high speed receiver 32 is driven by motor 12 an amount sufficient to rotate the rotor member of receiver 32 and the cam 44 to their initial positions and at this point the searchlight 10 will be in correspondence with the telescope 11. As thus far described power would be kept on the motor 12 until the instant that the searchlight 10 reached correspondence with the telescope 11. If this were the case, the stored energy of the motor 12 and the searchlight 10 would cause the searchlight 10 to overshoot the position of correspondence and the control would then be actuated in the reverse direction to return the searchlight in the opposite direction to a position of correspondence again with the telescope. But again power would be kept on the motor 12 until the searchlight reached correspondence with the telescope and this would cause the searchlight to overshoot in the reverse direction. As a result continuous oscillation or hunting would be set up and the searchlight would not come to rest in correspondence to the telescope.

However, this continuous oscillation or hunting is prevented by the anti-hunting means 56, 57.

The manner in which the anti-hunting means functions substantially to eliminate hunting will best be understood by referring to the chart of characteristic curves in Fig. 2. As shown in Fig. 2, curve 69 represents the relationship between displacement of the rocker arm 28 from its central or zero position and the error or positional disagreement between the searchlight 10 and telescope 11, with the rotor of the motor 12 blocked so as to prevent it from rotating and with the anti-hunting means 56, 57 disconnected or otherwise rendered inactive. This relationship is seen to be substantially a straight line relationship. With the rotor of the motor blocked, the current supplied to the motor is proportional to the displacement of the rocker arm 28 and consequently curve 69 also represents the relationship between motor current and error. Curve 70 represents the same relationship between displacement of the rocker arm or motor current and the error but with the anti-hunting means 56, 57 connected and functioning. Thus it will be noted that for any value of error the anti-hunting means functions to rotate the contact rocker arm 28 in a direction to reduce the current supplied to the motor because the flow of motor current acts through the anti-hunting means to impose a displacement of the contact rocker arm toward zero. The response between a change in motor current and resultant change in the position of the contact rocker arm is not immediate but is delayed a definite amount by the adjustable time constant of the saturable reactor bridge circuit itself. These curves illustrate static conditions with ample time given for the anti-hunting effect to reach a final steady value.

As a simple illustration of the stabilizing action of the anti-hunting circuit, let it be assumed that the director has been brought to standstill, and that the searchlight is synchronizing, i. e., coming into correspondence with the telescope. Eventually, the error becomes reduced to zero, but on account of the stored energy, the searchlight will overshoot and the error will increase in a negative direction. When the error becomes negative, the contact rocker arm 28 follows the error very closely and motor current is established to decelerate and reverse the motor. This current gives rise to the delayed anti-hunting signal so that as the error increases in the negative direction, the contact arm proceeds along the dotted curve to some point such as $a$ at which point the searchlight is at standstill and the rate of change of error is zero. The gradual departure of the dotted curve from the curve 69 toward the curve 70 as the error increases is caused by the gradual building up of the anti-hunting signal. When the error becomes maximum and begins to decrease, the position of the contact arm will be as shown by the continuation of the dotted line from the point $a$ to the point $0$ at which point the error is again zero. This position of the curve lies closer to the zero ordinate axis than does the curve 70 on account of the fact that the decreasing value of the anti-hunting effect is delayed. Now, when the error first passed through zero, the speed of the searchlight was relatively high and represented a considerable amount of stored energy. As the error increased negatively, the torque tending to reduce the speed of the searchlight was high as shown by the dotted curve up to the point $a$ at which point there exists no stored energy because the searchlight is momentarily at standstill. Now, as the searchlight is driven back toward the position of zero error, the driving torque is relatively low as shown by the dotted curve from the point $a$ to the point $0$ so that at point $0$ the stored energy is much less than when the error first became zero. Now if the searchlight carries on through zero the overtravel will be very small and will reach only to a point $b$ on curve 70, a much smaller overtravel than represented by the point $a$. As the error again decreases from the point $b$ to the point $0$, zero error and zero speed will probably occur simultaneously and no further overshooting occur. Thus it will be seen that the anti-hunting system effectually prevents any sustained or cumulative hunting action and promptly brings the driven object 10 into correspondence or to standstill in correspondence with the pilot device 11.

The error correction means, i. e., the coils 66 and 67, operate in very much the same manner as the anti-hunting device. As previously pointed out, these coils are energized by the counter voltage of the motor 12 which is directly proportional to the speed of the motor. This voltage is applied to the coils 66 and 67 in such a manner as to vary the balance of the reactor bridge so that a voltage is supplied to the receiver 32 which produces a torque tending to rotate the contact rocker arm 28 in a direction to reduce the correspondence error between the driven object 10 and the pilot device 11.

Figure 3:
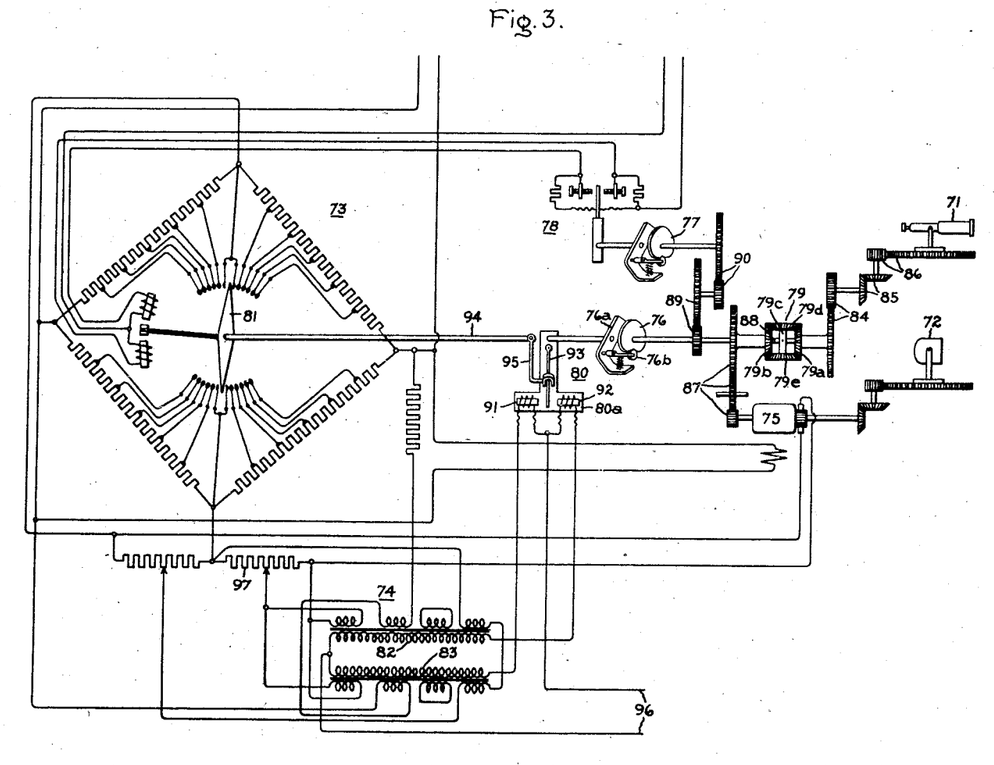
Fig. 3 is a simple diagrammatic sketch of a modification.

In the modification of Fig. 3 the pilot device 71, driven object 72, Wheatstone bridge 73, anti-hunting means 74, driving motor 75, high and low speed cams 76 and 77, and selective switch 78 are substantially identical in structure and function with corresponding elements in the system of Fig. 1. The arrangement of Fig. 3 differs from the system of Fig. 1 primarily in that the electrical motion transmitting and receiving system of Fig. 1 is replaced by a mechanical differential device 79 for actuating the high and low speed cam mechanism 76 and 77. The arrangement of Fig. 3 also differs from the arrangement of Fig. 1 in that a flexible connection 80 is included in the connections between the high speed cam mechanism 76 and the contact rocker arm 81 and further differs from the arrangement of Fig. 1 in the connection of the alternating current coils 82 and 83 of the anti-hunting mechanism for controlling the flexible connection 80 to introduce the anti-hunting and speed correction.

A mechanical differential member 79 has an input gear 79a which is connected through gearings 84, 85 and 86 to the pilot device 71. Also the differential device has a second input gear 79b that is connected through the gearing 87 to the drive shaft of the motor 75 which drives the driven object 72. The output member of the differential 79 comprises a cage member 79c carrying gears 79d and 79e which mesh with the gears 79a and 79b. The cage member 79c is mechanically connected to the output shaft 88 which passes through the hub of the upper gear 87 and is connected to the high speed heart cam 76. As shown, the output shaft 88 is also connected through gearing 89 and 90 to a low speed cam 77.

Flexible connection 80 comprises a T-shaped supporting member 80a which is secured to the shaft of the frame member 76a which carries the roller 76b that engages the high speed cam 76. The support 80a is provided with electromagnets 91 and 92 and a flexible member 93 rigidly mounted on the support 80a and arranged to extend between the cores of the electromagnets 91 and 92. The input shaft 94 of the contact rocker arm 81 is provided with a crank arm 95 connected slidably with the spring 93 so as to rotate the shaft 94 in response to pivotal movement of the supporting member 80a. Spring 93 is so stiff that it does not bend in normal operation of the contacts. The operating coil of electromagnet 91 is connected from the upper side of the supply source 96 through the lower reactor coil 83 to the opposite side of the supply source whereas the operating coil of electromagnet 92 is connected through the upper reactor coil 82 to the opposite side of the supply source. When a large current flows in the armature circuit of motor 75 the voltage across resistor 97 causes the impedance of one of the reactor coils 82 or 83 to increase and the other to decrease. This causes the current flowing through one of the electromagnets 91 and 92 to increase and the current flowing through the other to decrease. Hence the spring 93 is deflected thus shifting the contact rocker arm 81 a proportional amount. Thus the anti-hunting device 74 functions in a manner similar to that of the anti-hunting device 56, 57 of Fig. 1 but the anti-hunting correction is introduced into the connections between the high speed cam and the contact rocker arm by means of electromagnets 91 and 92 and flexible connection 80 instead of being introduced into the rotor winding of an electrical motion receiving device as in the system of Fig. 1.

In operation, rotation of the telescope 71 with the motor 75 at rest produces rotation of the output shaft 88 of the differential device and this rotation is transmitted through the high speed cam 76 and flexible connections 80 to the contact rocker arm 81 which rotates to unbalance the bridge and energize the motor 75 for rotation in a direction to drive the driven object 72 toward correspondence with telescope. As motor 75 rotates it revolves the input member 79b of the differential tending to return the contact arm 81 to its original position.

The anti-hunting operation is the same as in the system of Fig. 1 except as to the differences explained in the foregoing.

The self-synchronous and error correction features are accomplished in exactly the same manner as previously described for the arrangement of Fig. 1.

Although in accordance with the provisions of the patent statutes this invention is described as embodied in concrete form it will be understood that the apparatus and elements shown are merely illustrative and that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. A follow-up system for controlling a driven object to move in positional agreement with a pilot device comprising an electric motor for driving said object, a Wheatstone bridge having opposite bridge points connected to said motor each arm of said bridge having a plurality of taps each having a flexible contact, the contacts for opposite sides of said bridge being separated from each other and arranged in groups, a movable member for actuating said contacts, means responsive to positional disagreement of said pilot device and driven object for actuating said movable member to successively short-circuit portions of opposite arms of said bridge to effect unbalance thereof and energization of said motor to drive said object toward correspondence with said pilot device comprising a cam for actuating said movable member, an electrical motion transmitting device connected to said pilot device, and an electrical motion receiving device electrically connected to said transmitting device, said receiving device having a rotor element and a rotatably mounted stator element, one of said elements being mechanically connected to said cam and the other being mechanically connected to said driven object and anti-hunting means comprising an electrical device having a stationary winding connected to be responsive to an electrical operating condition of said motor and a second stationary winding controlled by said first winding and means connected to and controlled by said second stationary winding for actuating said movable member to substantially eliminate hunting.

2. A follow-up system for causing a driven object to move into positional correspondence with a pilot device comprising in combination an electric motor for driving said object, a Wheatstone bridge for controlling the energization of said motor, each arm of said bridge having a plurality of taps each provided with a flexible contact, the contacts for opposite sides of said bridge being grouped in rows, a movable member for actuating said contacts a cam for actuating said member, means responsive to positional disagreement of said pilot device and driven object for actuating said cam to cause said member to successively short-circuit portions of opposite arms of said bridge thereby to unbalance said bridge and energize said motor to drive said object toward correspondence with said pilot device comprising an electrical motion transmitting device connected to said pilot device, an electrical motion receiving device having a rotor member connected to said cam and a rotatably mounted stator member provided with a winding connected to the stator winding of said transmitting device and mechanically connected to said driven object and antihunting means comprising a saturable reactor having a winding connected to the armature circuit of said motor and a second winding controlled thereby and means connected to said second winding for actuating said movable member so as substantially to eliminate hunting.

3. A follow-up control system for causing a driven object to move into positional agreement with a pilot device comprising an electric motor for driving said object, a Wheatstone bridge for controlling the energization of said motor, each arm of said bridge having a plurality of taps each provided with a flexible contact, a movable member for actuating said contacts to unbalance said bridge, means responsive to positional disagreement of said pilot device and driven object for moving said member to actuate said contacts to short-circuit successively portions of opposite arms of said bridge thereby to unbalance said bridge and cause said motor to deliver power dependent upon the amount of unbalance, and means responsive to positional disagreement of said device and object in excess of a predetermined amount for holding said member in the maximum power position to cause said motor to drive said object toward correspondence with said device at maximum.

4. A follow-up control system for causing a driven object to move into positional agreement with a pilot device comprising an electric motor for driving said object, a Wheatstone bridge for controlling the energization of said motor, each arm of said bridge having a plurality of taps each provided with a flexible contact, the contacts of opposite sides of said bridge being grouped in respective rows, a movable member for actuating said contacts to short-circuit portions of opposite arms of said bridge to effect an unbalance, said member having a null position in which said bridge is balanced and said motor is deenergized, and movable in one direction from said null position to a position in which portions of a pair of opposite bridge arms are short-circuited and said motor is energized for rotation in one direction at maximum power and movable in the opposite direction from said null position to a position in which portions of the other pair of bridge arms are short-circuited and said motor is energized for rotation in the opposite direction at maximum power, said member being provided with an armature, a pair of electromagnets arranged in cooperative relationship therewith, means responsive to positional disagreement of said pilot device and driven object for actuating said movable member in a direction to energize said motor to drive said object toward correspondence with said device, and means responsive to positional disagreement of said device and object in excess of a predetermined amount for energizing one of said electromagnets to attract said armature and hold said member in one of said maximum power positions.

5. A follow-up system for causing a driven object to move into positional agreement with a pilot device comprising an electric motor for driving said object, a Wheatstone bridge for controlling the energization of said motor, the arms of said bridge having a plurality of taps each provided with a flexible contact, the contacts for opposite sides of said bridge being arranged in groups, a rotatable member arranged between said groups for actuating said contacts to short-circuit portions of opposite arms of said bridge, said member having a null position in which said bridge is balanced and said motor is deenergized, and two maximum power positions in which said motor is energized for rotation in opposite directions at maximum power, said rotatable member being provided with an armature, a pair of electromagnets arranged in cooperative relationship with said armature, fine control means comprising an electrical motion transmitting system connected to said pilot device and driven object for operation at high speed with respect thereto, and responsive to a predetermined amount of positional disagreement of said device and object for actuating said member to one of said maximum power positions, and coarse control means comprising a second electrical motion transmitting system connected to said device and object for operation at relatively low speed with respect to said high speed system and responsive to positional disagreement of said device and object in excess of said predetermined amount for effecting energization of one of said electromagnets to maintain said member in said maximum power position.

6. A follow-up control system for causing a driven object to move into positional agreement with a pilot device comprising driving means for said object, means for controlling said driving means, means responsive to positional disagreement of said pilot device and driven object for actuating said control means to cause said driving means to drive said object toward correspondence with said pilot device comprising an electrical motion transmitting device connected to said pilot device and an electrical motion receiving device electrically connected to said transmitting device and mechanically connected to said object, and anti-hunting means responsive to an operating condition of said driving means for supplying a current to said receiving device to cause said control means to reduce the torque of said driving means.

7. A follow-up control system for causing a driven object to move into positional agreement with a pilot device comprising in combination an electric motor for driving said object, means for controlling the current supplied to said motor, means responsive to positional disagreement of said pilot device and driven object for actuating said control means to cause said motor to drive said object toward correspondence with said pilot device comprising an electrical motion transmitting device connected to said pilot device and an electrical motion receiving device electrically connected to said transmitting device and mechanically connected to said object, and anti-hunting means for substantially eliminating oscillation of said object about the position of correspondence with said pilot device comprising an electrical device having a winding connected to the armature circuit of said motor to be responsive to an electrical operating condition of said motor and a second winding connected to said receiving device for supplying current to said receiving device to effect rotation thereof in a direction to reduce the current supplied to said motor.

8. A follow-up control system for moving a driven object into positional agreement with a pilot device comprising in combination an electric motor for driving an object, means for controlling the supply of current to said motor, means responsive to positional disagreement of said pilot device and driven object for actuating said control means to energize said motor to drive said object toward correspondence with said device comprising an electrical motion transmitting device connected to said pilot device and an electrical motion receiving device having two relatively movable members each provided with a winding, one of said members being mechanically connected to said object and one of said windings being connected to a corresponding winding of said transmitting device, and anti-hunting means responsive to the motor current for supplying a current to one of said windings in a direction to actuate said control means to reduce the current supplied to said motor.

9. A follow-up control system for moving a driven object into positional agreement with a pilot device comprising in combination an electric motor for driving an object, means for controlling the supply of current to said motor, means responsive to positional disagreement of said pilot device and driven object for actuating said control means to energize said motor to drive said object toward correspondence with said device comprising an electrical motion transmitting device connected to said pilot device and an electrical motion receiving device having two relatively movable members each provided with a winding, one of said members being mechanically connected to said object and the other mechanically connected to said control means, one of said windings being connected to a corresponding winding of said transmitting device, and anti-hunting means responsive to the motor current for supplying a current to the other of said windings in a direction to cause said receiving device to actuate said control means in a direction to reduce the motor current.

10. A follow-up control system for moving a driven object into positional agreement with a pilot device comprising an electric motor for driving said object, means for controlling the supply of current to said motor, means responsive to positional disagreement of said device and object for actuating said control means to cause said motor to drive said object toward correspondence with said pilot device comprising, an electrical motion transmitting device mechanically connected to said pilot device, an electrical motion receiving device having a rotor member and a rotatably mounted stator member, one of said members being mechanically connected to said control means and the other of said members being mechanically connected to said object, a winding on each of said members, one of said windings being electrically connected to a corresponding winding of said transmitting device, and means responsive to the current supplied to said motor for supplying a current to the other of said windings on said receiving device to affect rotation of said receiving device in a direction to reduce the current to said motor thereby substantially to eliminate hunting.

11. A follow-up control system for causing a driven object to move into positional agreement with a pilot device comprising in combination an electric motor for driving said object, a Wheatstone bridge for controlling the supply of current to said motor, a movable member for controlling the balance of said bridge, means responsive to positional disagreement of said pilot device and driven object for actuating said member to unbalance said bridge thereby to supply current to said motor to cause said motor to drive said object toward correspondence with said device at a speed dependent upon said disagreement, and saturable reactor means responsive to an electrical operating condition of said motor and means controlled by said reactor means for actuating said movable member in a direction to reduce the current to said motor thereby substantially to eliminate hunting.

12. A follow-up control system for moving a driven object into positional agreement with a pilot device comprising in combination, an electric motor for driving said object, a Wheatstone bridge for controlling the supply of current to said motor, a movable member for controlling the balance of said bridge, means responsive to positional disagreement of said pilot device and driven object for actuating said member to unbalance said bridge and energize said motor to drive said object toward correspondence with said pilot device, a saturable core reactor having an alternating current winding, a direct current control winding on said reactor connected to be responsive to the motor current for controlling said alternating current winding to produce a voltage, and means responsive to said voltage for actuating said movable member to reduce the current to said motor thereby substantially to eliminate hunting.

13. A follow-up control system for causing a driven object to move into positional agreement with a pilot device comprising in combination, an electric motor for driving said object, a Wheatstone bridge connected to said motor for controlling the supply of current to said motor, a movable member for controlling the balance of said bridge, means responsive to positional disagreement of said pilot device and driven object for actuating said movable member to unbalance said bridge to cause said motor to drive said object toward correspondence with said device comprising an electrical motion transmitting device connected to said pilot device and an electrical motion receiving device electrically connected to said transmitting device and mechanically connected to said object, and anti-hunting means for substantially preventing oscillation of said object about the position of correspondence with said pilot device comprising a saturable core reactor having an alternating current winding connected to said receiving device and a direct current control widing energized in response to the motor current so that a voltage dependent upon motor current is supplied to said receiving device to effect rotation thereof in a direction to reduce the motor current.

14. A follow-up control system for causing a driven object to move into positional agreement with a pilot device comprising in combination, an electric motor for driving said object, a Wheatstone bridge connected to said motor for controlling the supply of current to said motor, a movable member for controlling the balance of said bridge, means responsive to positional disagreement of said pilot device and driven object for actuating said movable member to unbalance said bridge to cause said motor to drive said object toward correspondence with said device comprising an electrical motion transmitting device connected to said pilot device and an electrical motion receiving device having a rotor element and a rotatably mounted stator element, one of said elements being mechanically connected to said object and the other mechanically connected to said member and each of said elements being provided with a winding, electrical connections between one of said windings and a corresponding winding of said transmitting device, and anti-hunting means comprising a saturable core reactor having an alternating current winding connected to the other winding of said receiving device and a direct current control winding energized in response to the motor current for varying the voltage of said reactor so that a current is supplied to said other winding of said receiving device to produce rotation of said receiving device and said member in a direction to reduce the current to said motor.

15. A follow-up control system for moving a driven object into positional agreement with a pilot device comprising in combination driving means for said object, means for controlling said driving means, means responsive to positional disagreement of said pilot device and object and having mechanical connections to said control means for actuating said control means to cause said driving means to drive said object toward correspondence with said pilot device, a flexible member included in said connections and means responsive to an operating condition of said driving means for deflecting said flexible member so as to actuate said control means to reduce the torque of said driving means thereby substantially to eliminate hunting.

16. A follow-up control system for causing a driven object to move into positional agreement with a pilot device comprising an electric motor for driving said object, means for controlling the supply of current to said motor, a differential device connected to said pilot device and driven object and having mechanical connections to said control means and responsive to positional disagreement of said pilot device and driven object for actuating said control means to energize said motor to drive said object toward correspondence with said pilot device, a flexible member in said connections and means responsive to the current supplied to said motor for deflecting said member in a direction to cause said control means to reduce the current to said motor thereby substantially to eliminate hunting.

17. A follow-up control system for causing a driven object to move into positional agreement with a pilot device comprising an electric motor for driving said object, a Wheatstone bridge for controlling the supply of current to said motor, a movable member for controlling the balance of said bridge, means responsive to positional disagreement of said pilot device and driven object for actuating said control means to energize said motor to drive said object toward correspondence with said pilot device comprising a mechanical differential device connected to said pilot device and driven object and having a mechanical connection to said movable member, a flexible member included in said connections, and anti-hunting means responsive to the current supplied to said motor for actuating said movable member in a direction to reduce the current to said motor comprising a saturable core reactor having an alternating current coil and direct current control winding connected to be responsive to the current of said motor for varying the voltage of said alternating current coil, and means responsive to said variation in voltage for deflecting said flexible member.

18. A follow-up control system for driving an object into positional agreement with a pilot device comprising in combination, driving means for said object, a Wheatstone bridge for controlling the energization of said driving means, each of the arms of said bridge being provided with a plurality of taps each having a spring contact, said contacts being arranged in spaced apart relationship with respect to each other, a movable member for actuating said contacts into engagement with each other thereby to short circuit portions of said bridge arms and to produce progressively increasing unbalance of said bridge, means responsive to positional disagreement of said pilot device and driven object for actuating said member to unbalance said bridge and energize said driving means to drive said object toward correspondence with said pilot device, and means for compensating the spring pressure of said contacts against said member.

19. A follow-up control system for driving a driven object into positional agreement with a pilot device comprising in combination, an electric motor for driving said object, a Wheatstone bridge for controlling the energization of said motor, each of the arms of said bridge being provided with a plurality of taps each having a spring contact, said contacts being arranged in groups and in spaced apart relationship with respect to each other, a member for actuating said contacts into engagement with each other to short circuit portions of said bridge arms in succession to effect progressively increasing unbalance of said bridge, means responsive to positional disagreement of said pilot device and driven object for actuating said member to cause said motor to drive said object toward correspondence with said pilot device, and means for compensating the spring pressure of said contacts against said member comprising a pair of continuously energized electromagnets spaced apart from each other and an armature connected to said member and arranged in the space between said magnets so that the force of attraction between said armature and one of said magnets is increased as said armature approaches said one magnet.

KENNETH K. BOWMAN.
GAROLD A. KANE.